July 7, 1953 — A. B. DICKIE — 2,644,335
DIAL INDICATING MECHANISM FOR MEASURING INSTRUMENTS
Filed July 28, 1948 — 2 Sheets-Sheet 1

Inventor
Alan Bain Dickie
By

July 7, 1953  A. B. DICKIE  2,644,335
DIAL INDICATING MECHANISM FOR MEASURING INSTRUMENTS
Filed July 28, 1948  2 Sheets-Sheet 2

Inventor
Alan Davis Dickie
By

UNITED STATES PATENT OFFICE 2,644,335

DIAL INDICATING MECHANISM FOR MEASURING INSTRUMENTS

Alan Bain Dickie, Bath, Somerset, England

Application July 28, 1948, Serial No. 41,097
In Great Britain July 28, 1947

5 Claims. (Cl. 73—397)

This invention relates to indicating or recording instruments of the type in which motion of a movable detector which is responsive to the variable factor to be indicated, or recorded, is converted into motion of the movable element of an indicator or recorder giving an indication or record of that factor. The invention may be applied to pressure and vacuum gauges, thermometers, tachometers, and many other instruments.

Such instruments are frequently required to indicate or record from zero over the full range available, although only a small part of the range is in use under normal working conditions. Thus, for example, in a steam pressure gauge, a zero reading on the scale is required for use when starting up the boilers, whereas normally only that part of the range in the neighbourhood of the working pressure is utilized. As working pressures tend to increase and longer scales are required it becomes necessary either to decrease the distance between graduations or to increase the size of the dials. The first expedient is undesirable as it reduces the accuracy with which readings can be observed, and the second is not always convenient or practicable, especially where space is restricted as on board ship.

It is one of the objects of the invention to overcome the above difficulties and to provide an improved indicating or recording instrument in which graduations, for like movements of the movable detector, in a particular or working range (including pressures below and above the working pressure) are more widely spaced than the remainder whilst retaining the full range of scale readings. An instrument as described above may be said to operate in two phases, i. e. a normal phase and a working phase and in said working phase the movable element is moved for a greater distance for like movements of the movable detector than in the normal phase. It is to be understood, however, that if desired no movement at all may be imparted to the movable element in the normal phase; alternatively, there may be more than two phases if desired. Mechanism according to this invention is particularly suitable for use with instruments of the edgewise dial type where the available scale length is more restricted than with flat face dials.

With the above and other objects in view the invention provides an instrument of the type referred to, having in combination with the movable detector and the movable element, cam means by which for different phases in the range of movement of the detector different degrees of movement are imparted to the movable element.

More specifically, the cam means is formed with a plurality of motion transmitting profile parts or sections having different profiles and, for example in a dial instrument, the dial is provided with a scale having sections including differently spaced graduations (for equal movements of the movable detector) corresponding with the aforesaid cam parts or sections, the preferred arrangement being that the graduations of that part of the scale most generally used are more widely spaced (for equal movements of the movable detector) and collectively occupy an appreciable portion of the total scale length, e. g. a portion at least equal to that occupied by the remaining graduations.

It is preferred that the slopes of each or selected parts or sections of the cam thereof, should be of such a uniform nature that the graduations of the corresponding section, or sections, of the scale may be uniformly spaced, so that equal movements of the pointer or indicating means will correspond to equal changes in the measured quantity within each range in question.

A rotary cam element is employed having cam surfaces or profiles of spiral or logarithmic form and transmitting motion to a follower having pivotal motion, suitable means being provided for converting the motion of the movable detector and of the follower into oscillatory motion of the cam and of the movable element respectively. In a convenient arrangement according to the invention, motion of the movable detector is transmitted through a pivoted toothed quadrant to a pinion associated with the rotary cam member, and the follower comprises a pivoted quadrant (or a slidable rack) engaging with a pinion to which the movable element is connected.

According to a further feature of the invention the cam comprises a rotary disc having a groove or slot therein engaged by the follower, the slot or groove comprising at least one section being of less spirality with respect to the axis of said disc, and occupying the greater part of the total effective angular movement of the cam and being formed to control the movable element for the major part of the movement of the movable detector and at least another section being of greater spirality and formed to control the movable elements for the remaining part of the said movement of the movable detector. The movable element is controlled by the second section of the cam to give a comparatively magnified reading; for this purpose the graduations of a scale associated with the movable element (for equal movements of the movable detector) are more widely spaced for the second section of the disc than those of the other part of the scale. Thus in one example the major portion of the cam profile or slot may comprise a uniform spiral and the remainder a uniform spiral of greater slope than the first, the scale graduations being disposed accordingly.

It will be understood that the cam profiles, slots, or grooves may be variously modified and may consist of several sections each having a different slope if desired. The motion transmission parts within the instrument may also be modified, for example instead of the toothed quadrant and rack elements there may be substituted their mechanical equivalents.

The above and other features of the invention are set forth in the appended claims and are disclosed in the detailed description, given by way of example, of the particular embodiments illustrated in the accompanying drawings in which:

The invention may be applied to many types of indicating or recording instruments but by way of example, the invention is illustrated as applied to a steam pressure gauge of the conventional type.

Figure 1:
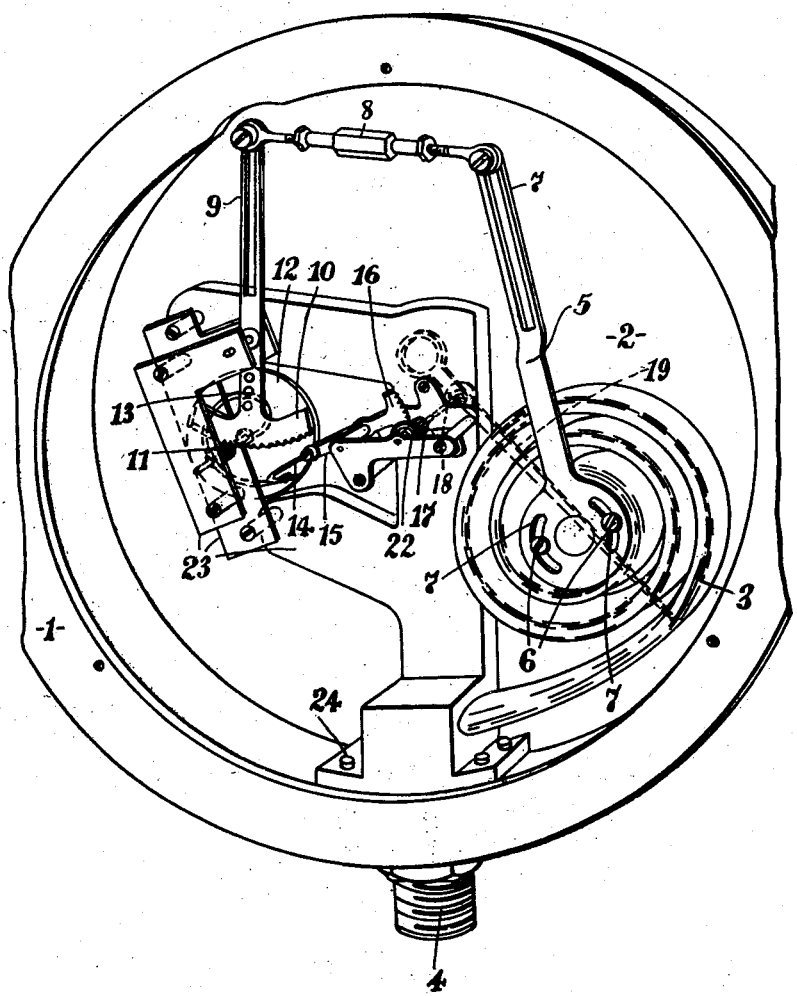
Figure 1 is a rear perspective view of an instrument according to this invention.

Referring now to Figure 1 the gauge comprises a casing 1, a dial 2 and a Bourdon tube 3 (constituting the movable detector). An inlet 4 to the tube 3 is provided; an arm 5 is fixed by screws 6 to the movable end of the tube 3. Slots 7 permit adjustment of this arm 6 relatively to the tube 3. The arm 5 is connected by an adjustable link or turnbuckle 8 to the tail 9 of a pivoted quadrant 10 and the teeth of the quadrant mesh with those of a pinion 11. The parts 7 and 9 are slotted to permit adjustable connection of the link 8 thereto. A circular disc 12 is rotatable with the pinion 11 and is formed with a spiral cam slot 13 in which is engaged a follower member. This follower is a cranked arm 14 and it is connected to the tail 15 of a quadrant 16 meshing with a pinion 17 fixed to a spindle 18 to which a pointer 19 (constituting the movable element) is also fixed; preferably a coiled hair spring 22 is provided maintaining the cam-engaging part of the follower in engagement with one side of the cam slot to prevent backlash. The hair spring also functions to prevent chatter between the quadrant 16 and the pinion 19 thereby stabilizing the movement of the pointer.

Figure 2:
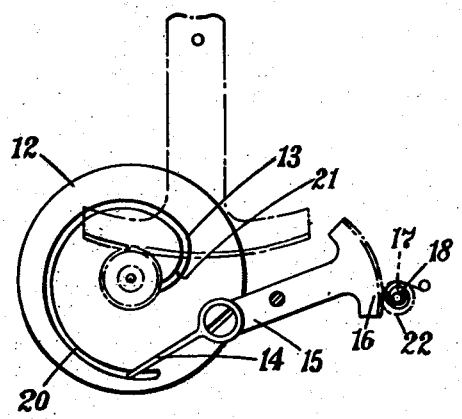
Figure 2 is an enlarged detail thereof.
Figure 3:
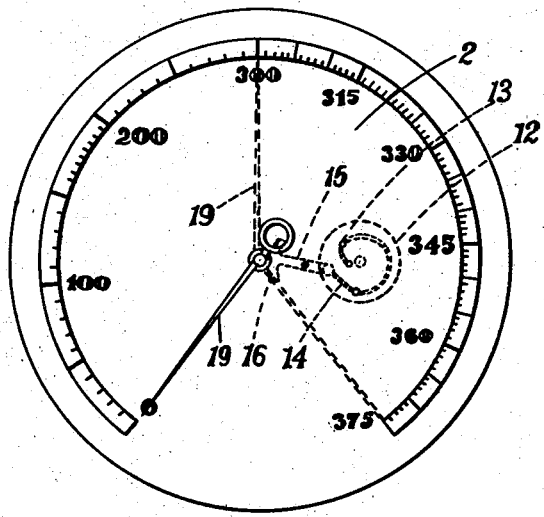
Figure 3 is a front view of the instrument.

The outer portion 20 (Figure 2) of the cam slot 13 determines the motion of the pointer over the first part of the scale and has an appropriate spiral characteristic, being such that a given angular movement of the cam disc results in a given angular displacement of the pointer, the scale readings denoting the corresponding pressures. The inner portion 21 of the cam slot 13 determines the motion of the pointer over the second part of the scale for the working range of pressures and the spiral characteristic of this portion 21 of the slot is such as to effect a comparatively greater movement of the pointer for a given difference in pressure than that effected by the outer portion 20. Thus in the specific example illustrated, the gauge is arranged for a working pressure of for example approximately 335 lbs. per square inch and its dial is graduated from 0 to 375. One half of the scale is uniformly graduated from 0 to 300, and the remaining half is also uniformly graduated from 300 to 375, intermediate graduations being also provided. The cam slot 13 is formed so that $\frac{8}{10}$ of the angle occupied by the total effective length of the slot consists of a uniform spiral slot 20 adapted to effect one half of the total displacement of the follower, i. e. half the total travel of the pointer. The remaining $\frac{2}{10}$ of the slot 13 is formed to effect the remaining half displacement of the follower and is also a uniform spiral slot 21. The graduations on the scale are arranged to indicate the correct pressures and those which indicate pressures between 300 and 375 lbs. per square inch are more widely spaced apart for given differences in pressure than the remainder (as shown in Figure 3). These more widely spaced graduations may be sub-divided, as shown, whereby accurate readings over the working range of 300 to 375 lbs. per square inch may be readily taken, and it will be understood that the 75 lbs. per square inch working range include 35 lbs. below the working pressure of 335 lbs. and 40 lbs. above.

Conveniently the Bourdon tube 3 and all the movable parts of the gauge are carried by a bracket assembly 23 which is fixed by screws 24 to the casing 1.

Each portion 20 and 21 of the cam slot 13 progressively increases along the slot uniformly in radial distance from the axis of the disc for equal angles and the two slot portions merge one into the other; the width of the slot is substantially the same as the cross sectional diameter of the follower member.

Whilst in the arrangement described above the indication is given by a pointer movable over a dial, it will be understood that equivalent arrangements, as for example a movable dial in association with a fixed pointer, might also be employed.

As an example of the advantages afforded by the invention it may be stated that in a conventional type of pressure gauge reading from 0 to 1000 lbs. per square inch for use on a system working at 900 lbs. per square inch the length of scale is 16 inches approximately and the space between the 100 lbs. markings is thus 1.6 inches. In a gauge according to the invention having the same total length of scale the spacing between graduations of 100 lbs. per square inch up to 800 lbs. is 1 inch and from 800 to 1000 lbs. this spacing is 4 inches.

In a conventional instrument having an edgewise type of scale with the same range and working pressure as above, the length of scale is approximately 7 inches and hence the space between 100 lbs. markings is 0.7 inch. A similar instrument constructed in accordance with the invention would have 100 lbs. markings spaced at $\frac{7}{16}$ inch up to 800 lbs. and 3½ inches from 800 lbs. to 1000 lbs.

It is to be understood that whereas in the above detailed construction with reference to the drawings the cam disc has two spiral cam sections, there may be only one spiral cam section if desired; in this event, the first part of the cam may be concentric with the cam axis instead of being spiral so that no movement is imparted to the movable element up to a predetermined pressure; this construction is particularly suitable for a gauge which is required to indicate only overload pressures, and which therefore only commences to indicate pressures at a predetermined advanced stage. In normal type gauges for this purpose, an internal stop is provided for limiting the movement of the movable detector or parts movable thereby, but this imposes a strain on the parts which is avoided by the present invention. Alternatively, there may be any desired number of cam sections having different spiral characteristics; for example, there may be three cam sections the first of which operates to give normal readings, the second gives magnified readings and the third gives normal readings again.

I claim:

1. An indicating instrument having a continuous scale and a co-operating indicator member relatively movable along the full length of such scale, and comprising a detector member moving with variations in the quantity being indicated, a rotary cam having a continuous non-circular cam surface and being driven by said detector, and a cam follower engaging said cam surface and driving said indicator, said scale having graduations, in at least one part of a different pitch to those in the remainder, and said continuous non-circular cam surface of said cam being spaced from the axis of rotation of the cam, one section of said cam surface uniformly varying its spacing from said axis according to a first given rate of variation, and another section of said surface uniformly varying its spacing from said axis according to a second given rate of variation said indicator member moving over said one part of said graduations when said cam follower moves along said one section of said cam surface, said indicator moving over said remainder of said graduations when said cam follower moves along said other section.

2. An indicating instrument according to claim 1, wherein the graduations in said one part of the scale are of equal size and are of closer pitch than those in the remaining part of the scale, also of equal size, and wherein, said one section of the cam surface varies in its spacing from said axis to a lesser extent than the second section.

3. An indicating instrument having a continuous scale with the earlier part of different pitch of graduation from the later part, a pointer movable over that scale, a rotary cam, and a cam follower for moving said pointer over said scale, said cam having a continuous non-circular cam surface spaced from the axis of rotation of said cam and engaging said cam follower, one section of said cam surface uniformly varying in its spacing from said axis according to a first given rate of variation for moving the pointer over said earlier part of the scale and another section of said cam surface uniformly varying in its spacing from said axis to a different extent according to a second given rate of variation for moving the pointer over the later part of the scale.

4. An indicating instrument having co-operating relatively movable indicating members whereof one is a scale with graduations in at least one part of different pitch to those of the remainder, a cam follower for effecting relative movement between said members and a rotary cam for moving said cam follower having a continuous non-circular cam surface spaced from the axis of rotation of said cam, one section of said surface uniformly varying in its spacing from said axis according to a first given rate of variation to be indicated for effecting relative movement between said members with reference to said one part of the scale, and another section of said surface uniformly varying in its spacing from said axis according to a second rate of said variation for effecting said relative movement with reference to the remaining part of the scale.

5. An indicating instrument, comprising, a casing, a movable detector member mounted in said casing movable with variations in the quantity to be indicated, a rotary cam having a continuous non-circular cam surface, cam driving means connecting said detector with said cam, a cam follower engaging said cam surface, an indicator member, motion transmitting means connecting said cam follower with said indicator member, and a scale having a first part provided with graduations of closer pitch, and a second part provided with graduations of a wider pitch, said cam surface being spaced from the axis of rotation of said cam, one section of said cam surface uniformly varying the spacing thereof from said axis according to a first rate of variation, and another section of said cam surface uniformly varying the spacing thereof from said axis according to a second rate of variation, said one section varying its spacing to a lesser extent than said other section of said cam surface, said indicator member moving over said first part, and over said second part of said scale, respectively, when said cam follower engages said one section, and said other section of said cam surface, respectively.

ALAN BAIN DICKIE.

References Cited in the file of this patent

UNITED STATES PATENTS

| Number | Name | Date |
|---|---|---|
| 1,414,154 | Place | Apr. 25, 1922 |
| 1,444,098 | Berry | Feb. 6, 1923 |
| 2,000,308 | Von Schuetz | May 7, 1935 |

FOREIGN PATENTS

| Number | Country | Date |
|---|---|---|
| 9,976 | Great Britain with No. 20,360 of 1908 | Apr. 27, 1909 |
| 416,766 | Great Britain | Sept. 20, 1934 |